United States Patent
Jenkins

(10) Patent No.: US 10,962,062 B2
(45) Date of Patent: Mar. 30, 2021

(54) UNIDIRECTIONAL TORQUE-TRANSFER COUPLING

(71) Applicant: Caterpillar Inc., Deerfield, IL (US)

(72) Inventor: William Jenkins, Flora, IN (US)

(73) Assignee: Caterpillar Inc., Peoria, IL (US)

( * ) Notice: Subject to any disclaimer, the term of this patent is extended or adjusted under 35 U.S.C. 154(b) by 33 days.

(21) Appl. No.: 16/415,980

(22) Filed: May 17, 2019

(65) Prior Publication Data

US 2020/0362920 A1 Nov. 19, 2020

(51) Int. Cl.
 *F16K 31/44* (2006.01)
 *F16D 3/10* (2006.01)
 *F16D 1/08* (2006.01)

(52) U.S. Cl.
 CPC .............. *F16D 3/10* (2013.01); *F16D 1/08* (2013.01); *F16K 31/44* (2013.01)

(58) Field of Classification Search
 CPC .......... F61K 31/535; F61K 31/44; F16D 3/10; F16D 1/08
 USPC .......................................................... 251/77
 See application file for complete search history.

(56) References Cited

U.S. PATENT DOCUMENTS

| | | | |
|---|---|---|---|
| 1,519,517 A * | 12/1924 | Thayer | F01N 5/00 251/76 |
| 1,990,197 A * | 2/1935 | Mohr | F16K 27/08 74/504 |
| 2,338,725 A * | 1/1944 | Larson | F16K 31/60 74/504 |
| 3,208,469 A * | 9/1965 | Gravert | F16K 3/04 137/343 |
| 3,581,857 A * | 6/1971 | Dallman | F16D 43/18 192/41 R |
| 3,685,790 A | 8/1972 | Crowe | |
| 3,687,414 A * | 8/1972 | Petty | F16K 35/00 251/77 |
| 4,261,224 A | 4/1981 | Sulzer | |
| 4,273,307 A | 6/1981 | Malinski et al. | |
| 4,328,780 A * | 5/1982 | Andrew | G01N 25/28 73/23.32 |
| 4,615,639 A * | 10/1986 | Seireg | F16D 1/0876 403/356 |
| 5,195,721 A | 3/1993 | Akkerman | |
| 5,916,325 A | 6/1999 | Madrid et al. | |
| 2011/0193003 A1 | 8/2011 | Tachikawa et al. | |

* cited by examiner

*Primary Examiner* — Umashankar Venkatesan
(74) *Attorney, Agent, or Firm* — Harrity & Harrity LLP

(57) ABSTRACT

A unidirectional torque-transfer coupling is disclosed. The coupling may include a first ring and a second ring that share a common axis, wherein the first ring is configured to rotate about the common axis from a first position to a second position; a first member extending from the first ring; and a second member extending from the second ring, wherein, when the first ring is in the second position and a valve coupled to the second ring is in an open position, the second member engages the first ring, and wherein, when the first ring moves from the second position to the first position, the first member causes the second ring to rotate in a same direction as the first ring Furthermore, when the first ring is in the second position, a valve is substantially unrestricted by the first ring with regard to moving to an open position.

20 Claims, 6 Drawing Sheets

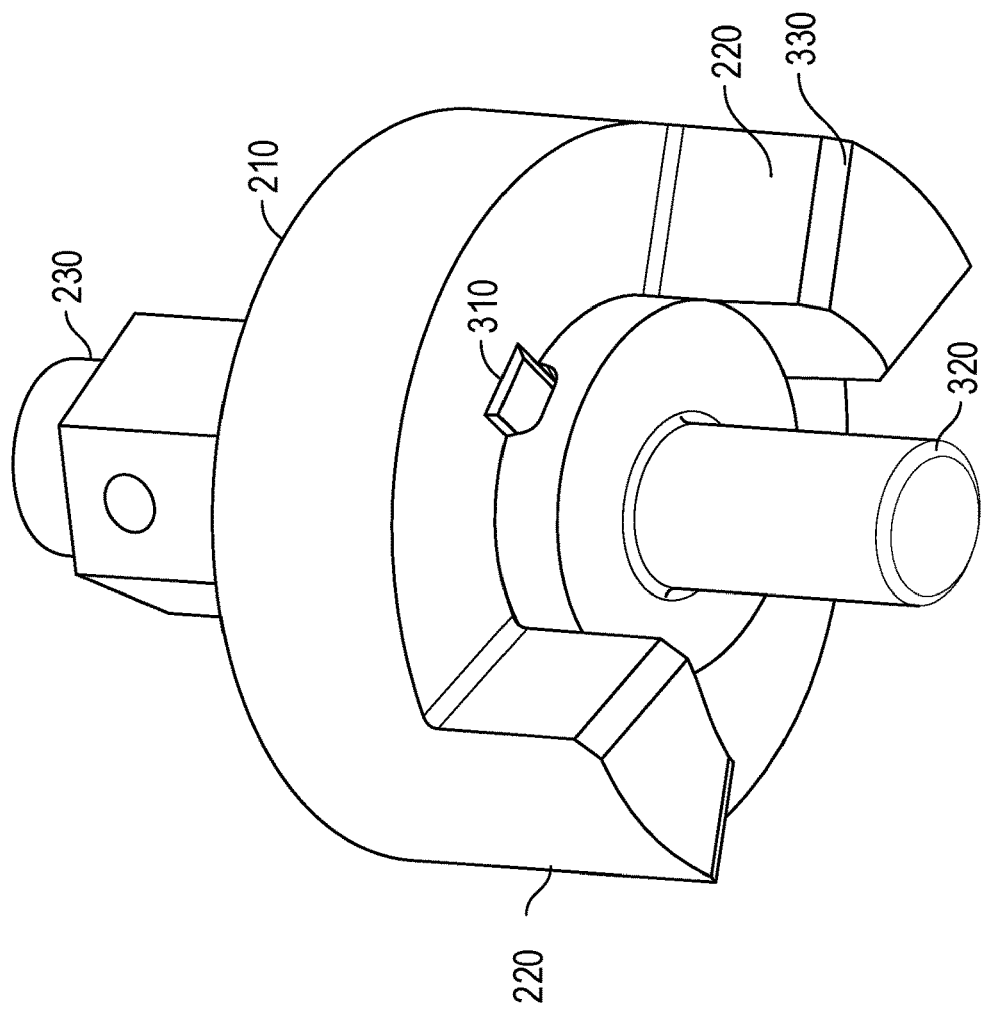
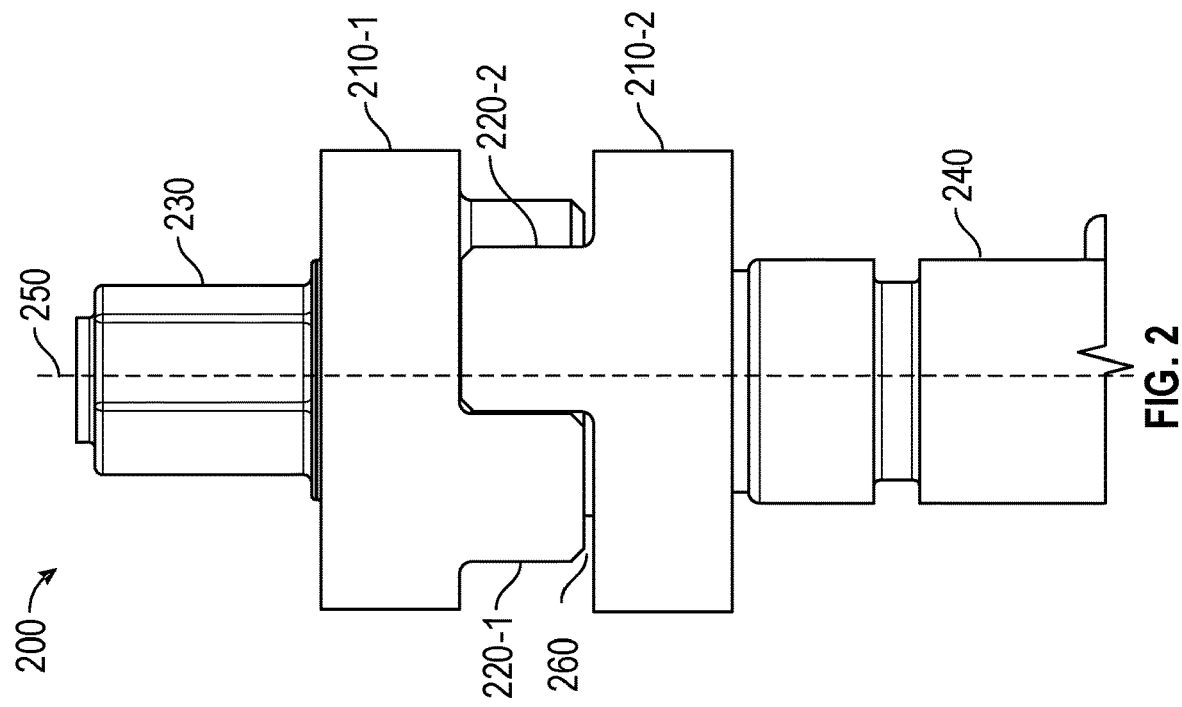

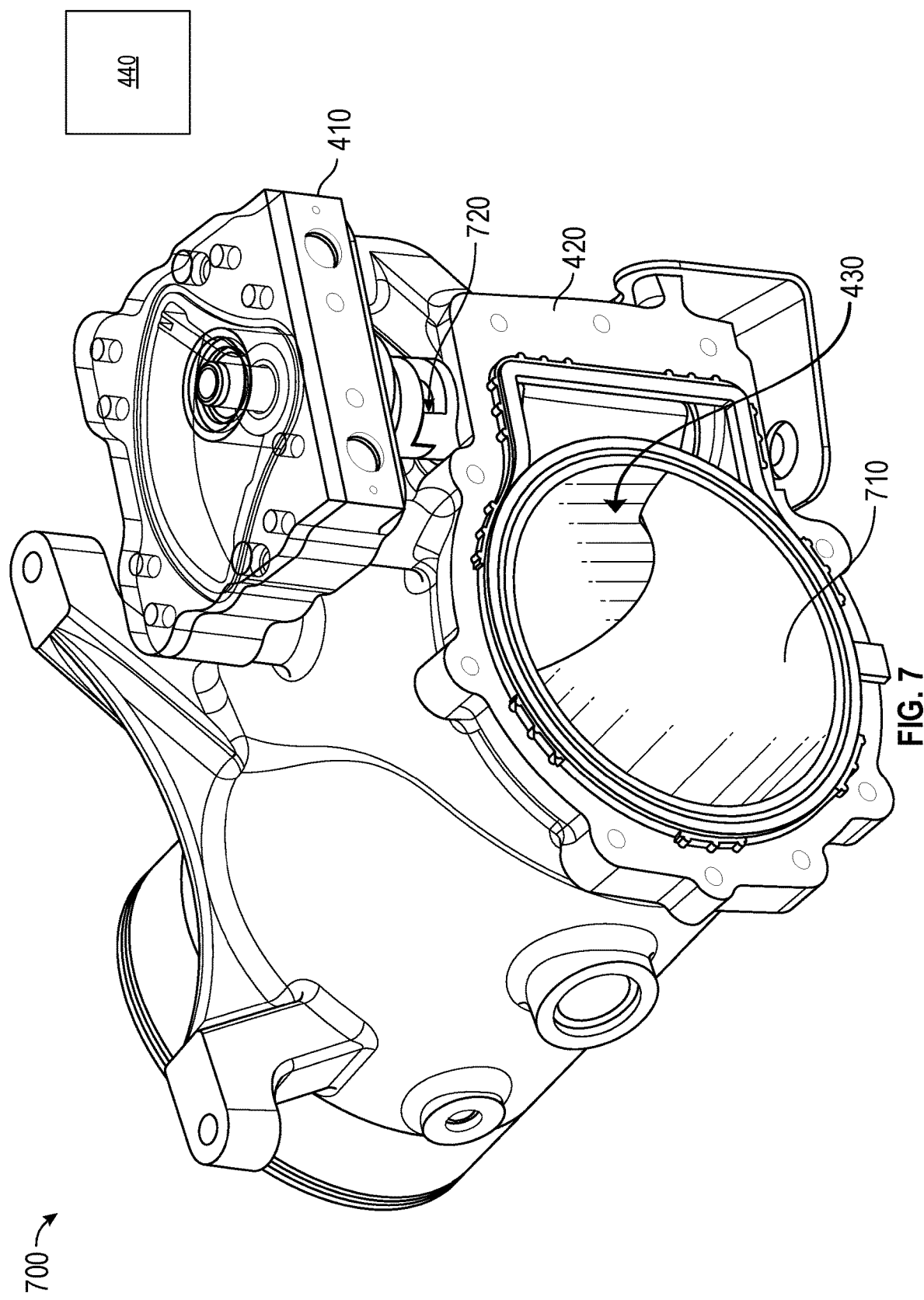

UNIDIRECTIONAL TORQUE-TRANSFER COUPLING

TECHNICAL FIELD

The present disclosure relates generally to an engine system and, for example, to a unidirectional torque-transfer coupling.

BACKGROUND

In a system that includes a valve assembly, an actuator applies torque to a valve shaft in order to close an associated valve, when desired. A fluid flowing through the valve is used to open the valve when the pressure balance on the valve changes such that fluid can flow in the desired direction. It may be desirable for an opening interval for the valve to be quick, to permit fluid to pass through the valve, thereby improving the performance of the system. However, a resistance of the actuator may slow the valve opening speed to an unacceptable rate, thereby negatively impacting performance of the system.

One attempt to improve a valve opening speed is disclosed in U.S. Pat. No. 4,261,224 that issued to SULZER on Apr. 14, 1981 ("the '224 patent"). In particular, the '224 patent discloses a valve actuator that includes a planetary gear assembly. The valve stem is coupled to the planetary gear assembly through torque-release gearing; the handwheel is coupled to the planetary gear assembly through the worm; and the motor is coupled to the assembly through a one-way coupling means. The train from the valve stem to the planetary drive gear encompasses a sleeve which is keyed to the valve stem and is provided with an external gear coaxial with the valve stem. The external gear is meshed with the torque-limiting assembly which includes a first pinion, a second pinion, and detent means releasably interconnecting the two pinions. The detent is spring biased by spring washers pressing the first pinion into axial engagement with the second pinion to retain the ball of the detent means in position. The confronting surfaces of the pinions have detents which are axially aligned with one another to form two pairs of registering seats. This torque-limiting connection is effective to interrupt the train when the torque differential is sufficient to overcome the bias of the spring washers and to permit disengagement of the ball from one of its seats in the pinions. The second pinion is meshed with the planet drive gear. The direct, in-line drive from the motor through the planetary gear assembly to the valve stem enables the valve stem to be operated at a high speed, consistent with the ability of the butterfly valve element to open or close in the passageway provided by the valve casing. In the event of resistance, as for example, caused by a blockage of the motion of the valve stem, the resistance to rotation of the valve stem is transmitted backwardly as a counter-torque. This counter-torque is fed back through the torque release gearing to the planet drive of the planetary gear assembly. If the fedback torque is greater than that which can be transmitted by the torque-release coupling to the coupling will release and prevent overloading of the valve stem.

While the valve actuator of the '224 patent may provide a motor coupled to an assembly through a one-way coupling means, the planetary gear device, torque-limiting assembly, and worm and pinion connection of the '224 patent may increase complexity and expense and may decrease reliability of the system relative to a simpler valve actuator. Furthermore, the structure described in the '224 patent releases and prevents overloading of a valve stem when fedback torque is greater than that which can be transmitted by the torque-release coupling to the coupling, which is a different structure to that described herein. The unidirectional torque-transfer coupling of the present disclosure solves one or more of the problems set forth above and/or other problems in the art.

SUMMARY

A coupling may include a first ring and a second ring that share a common axis, wherein the first ring is configured to rotate about the common axis from a first position to a second position; a first member extending from the first ring; and a second member extending from the second ring; wherein, when the first ring is in the second position and a valve coupled to the second ring is in an open position, the second member engages the first ring, and wherein, when the first ring moves from the second position to the first position, the first member causes the second ring to rotate in a same direction as the first ring.

A system may include a valve; an actuator; and a coupling comprising a first ring coupled to the actuator and a second ring coupled to the valve, wherein the first ring and the second ring share a common axis, and wherein a first member extends from the first ring toward the second ring and a second member extends from the second ring toward the first ring.

A method may include transmitting, by a controller, a signal to cause an actuator to move from a first actuator position to a second actuator position, wherein the actuator is coupled to a first ring, wherein moving the actuator from the first actuator position to the second actuator position moves the first ring from a first position to a second position, wherein, when the first ring is in the second position, a valve is substantially unrestricted by the first ring with regard to moving to an open position; and transmitting, by the controller, a signal to cause the actuator to move from the second actuator position to the first actuator position, wherein moving the actuator from the second actuator position to the first actuator position moves the first ring from the second position to the first position, wherein the first ring engages a second ring coupled to the valve when the first ring is moved from the second position to the first position, thereby closing the valve.

BRIEF DESCRIPTION OF THE DRAWINGS

FIG. 2 is a diagram of an example unidirectional torque transfer coupling.

FIG. 3 is a diagram of an example ring, members, key, and shaft of a coupling.

FIG. 7 is a diagram of a third example operational state of the system of FIG. 4.

DETAILED DESCRIPTION

This disclosure relates to a unidirectional torque-transfer coupling, referred to herein as a coupling for brevity. The coupling has universal applicability to any machine with an engine utilizing an air induction system. The term "machine" may refer to any machine that performs an operation associated with an industry such as, for example, mining, construction, farming, transportation, or any other industry. As some examples, the machine may be a vehicle, a backhoe loader, a cold planer, a wheel loader, a compactor, a feller buncher, a forest machine, a forwarder, a harvester, an excavator, an industrial loader, a knuckleboom loader, a material handler, a motor grader, a pipelayer, a road reclaimer, a skid steer loader, a skidder, a telehandler, a tractor, a dozer, a tractor scraper, or other above ground equipment, underground equipment, or marine equipment (e.g., a boat or another type of marine vessel).

Figure 1:
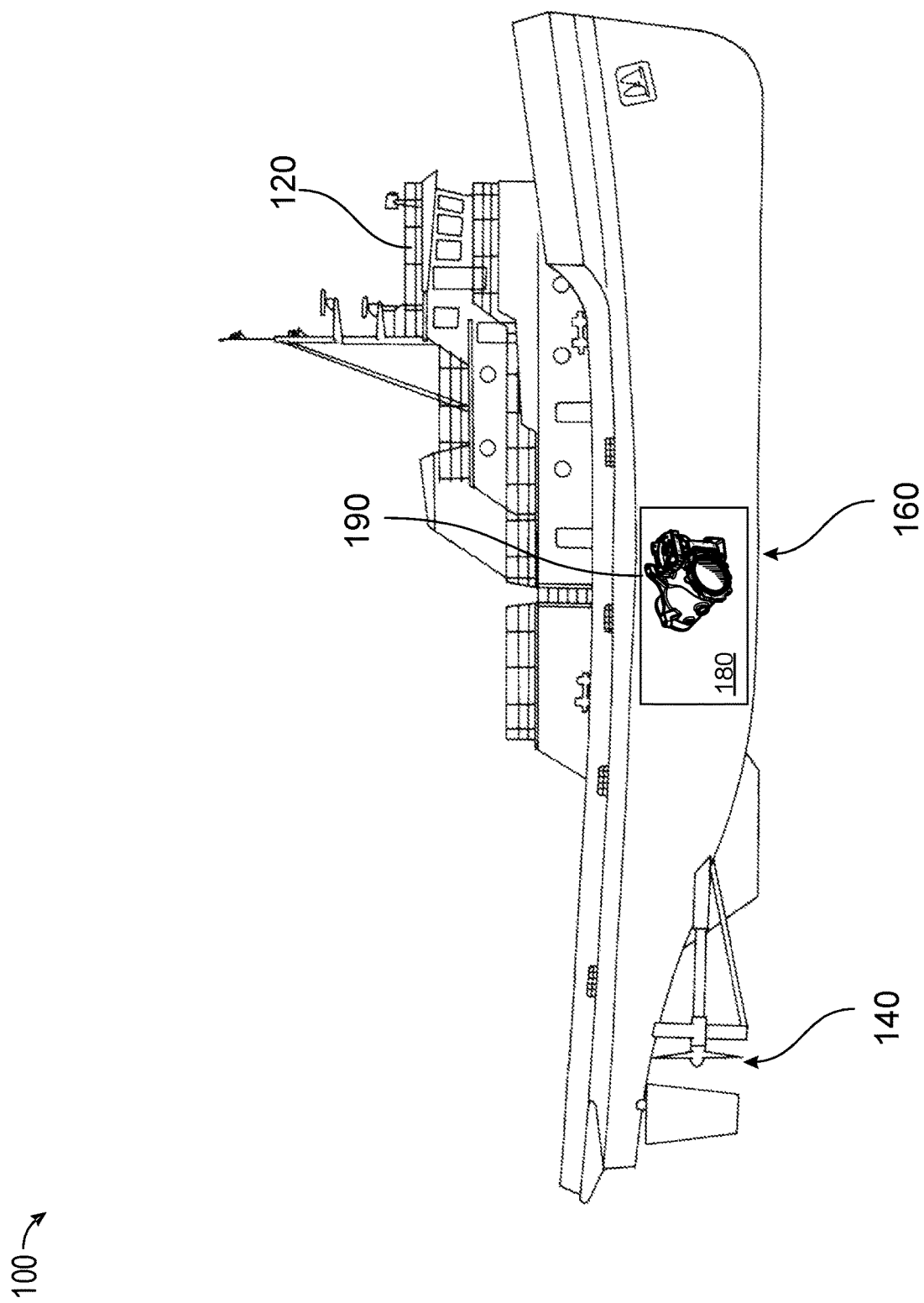
FIG. 1 is diagram of an example machine described herein.

FIG. 1 is a diagram of an example machine 100 described herein. For example, machine 100 may include a mobile machine such as the boat shown in FIG. 1, a land-based machine, or any other type of mobile machine. Machine 100 may include an operator station 120, a propeller 140, and a powertrain 160 with an engine 180 operatively connected to drive the propeller 140. As shown, engine 180 may include or be associated with a system 190, which is described in more detail in connection with FIGS. 2-7, below. System 190 may include an air induction system or another type of system that provides air flow for powertrain 160 or engine 180. It should be noted that the apparatuses and control methods described herein can be applied for any type of machine that includes an engine 180.

As indicated above, FIG. 1 is provided as an example. Other examples may differ from what is described in connection with FIG. 1.

FIG. 2 is a diagram of an example unidirectional torque transfer coupling 200 (referred to as coupling 200 for brevity). As shown, coupling 200 may include a first ring 210-1 and a second ring 210-2. First ring 210-1 includes a first member 220-1, and second ring 210-2 includes a second member 220-2. First ring 210-1 may be coupled to a first shaft 230 (sometimes referred to herein as a shaft) and second ring 210-2 may be coupled to a second shaft 240 (sometimes referred to herein as a shaft). First ring 210-1 and second ring 210-2 may share a common axis 250.

Member 220 may extend from ring 210. For example, member 220 may extend perpendicularly from a plane of ring 210 (e.g., the plane may be perpendicular to the common axis 250). When engaged to form coupling 200, first member 220-1 may extend toward second ring 210-2, and second member 220-2 may extend toward first ring 210-1. First shaft 230 may couple first ring 210-1 to an actuator (not shown in FIG. 2). Second shaft 240 may couple second ring 210-2 to an air valve (not shown in FIG. 2). First ring 210-1 and first shaft 230 may rotate about common axis 250 based on motion of first shaft 230, which may be driven by the actuator. Similarly, second ring 210-2 and second shaft 240 may rotate about common axis 250 based on motion of first ring 210-1 and/or the air valve, depending on whether first member 220-1 has engaged second member 220-2. This is described in more detail in connection with FIGS. 5-7. In some implementations, a space 260 may be provided between first ring 210-1 and second member 220-2 or between first member 220-1 and second ring 210-2, which may reduce wear between ring 210 and member 220.

As indicated above, FIG. 2 is provided as an example. Other examples may differ from what was described in connection with FIG. 2.

FIG. 3 is a diagram of an example of a ring 210, members 220, a key 310, and a bearing 320 of a coupling 200. As shown, in some implementations, ring 210 may be associated with multiple members 220. Here, ring 210 is associated with two members 220, though any number of members 220 may be used. A larger number of members 220 may improve the strength of coupling 200, whereas a smaller number of members 220 may simplify fabrication and reduce cost of coupling 200. Key 310 may couple ring 210 to first shaft 230. Coupling 200 may include any number and arrangement of keys 310. Bearing 320 may align ring 210-1 and/or shaft 230 with shaft 240 and/or second ring 210-2. In some implementations, bearing 320 may be provided on or affixed to shaft 240 (not shown in FIG. 3). In some implementations, member 220 may be fabricated as part of ring 210. In other implementations, member 220 may be affixed to ring 210 (e.g., via welding, using a key, and/or the like). Member 220 may include a beveled edge 330, which may improve resilience of member 220 and reduce damage associated with contaminants and/or the like.

As indicated above, FIG. 3 is provided as an example. Other examples may differ from what was described in connection with FIG. 3.

Figure 4:
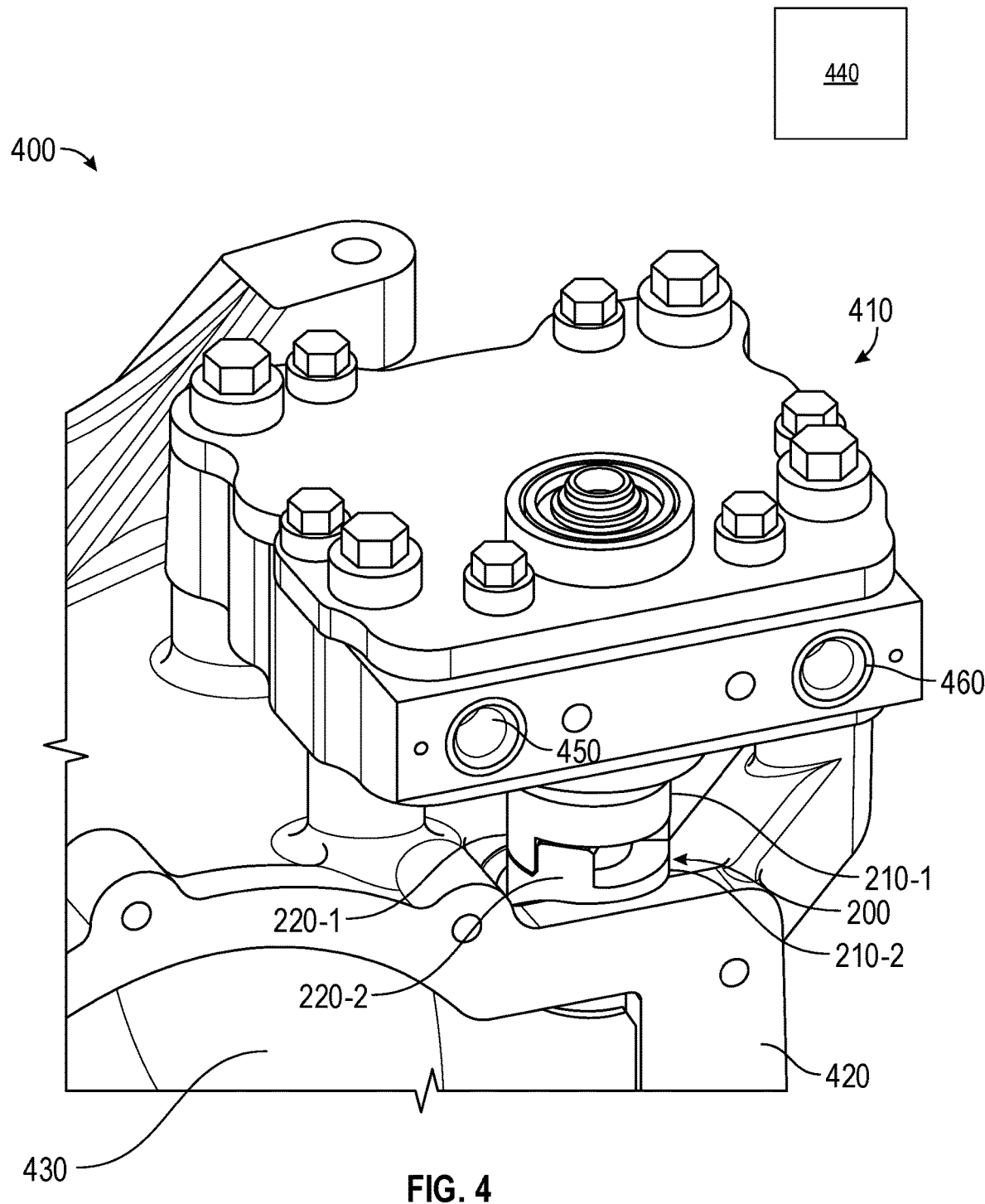
FIG. 4 is a diagram of an example system that includes the coupling of FIG. 1.

FIG. 4 is a diagram of an example system 400 that includes the coupling 200 of FIG. 2. System 400 includes the coupling 200, an actuator 410, and an air valve system 420. Actuator 410 may be coupled to first ring 210-1 by shaft 230 (not shown in FIG. 4). A valve 430 of air valve system 420 (only partially shown in FIG. 4) may be coupled to second ring 210-2 by shaft 240 (not shown in FIG. 4). In some implementations, system 400 may be part of an air induction system, such as an air induction system associated with an engine 180. For example, actuator 410 may close valve 430 when the air induction system is not to intake air via air valve system 420, and valve 430 may be opened by fluid pressure (e.g., air pressure) when the air induction system is to intake air via air valve system 420. In some implementations, air valve system 420 may comprise an air intake of an air induction system. Valve 430 may comprise any type of valve, such as an air valve and/or the like.

Actuator 410 may include any type of actuator that can be controlled by a controller 440. As just one example, actuator 410 may include a hydraulic actuator, such as a rotary hydraulic actuator. In this case, actuator 410 may include a hydraulic fluid inlet 450 and a hydraulic fluid outlet 460, which may be used to actuate actuator 410 from a first actuator position to a second actuator position or vice versa. Controller 440 may be considered a part of system 400 or may be separate from system 400. Controller 440 may control the movement of actuator 410 and/or other components of system 400 or a machine 100 in which system 400 is included. For example, controller 440 may include an electronic control module, a processor, and/or the like. Valve 430 may include any type of valve.

As indicated above, FIG. 4 is provided as an example. Other examples may differ from what was described in connection with FIG. 4.

Figure 5:
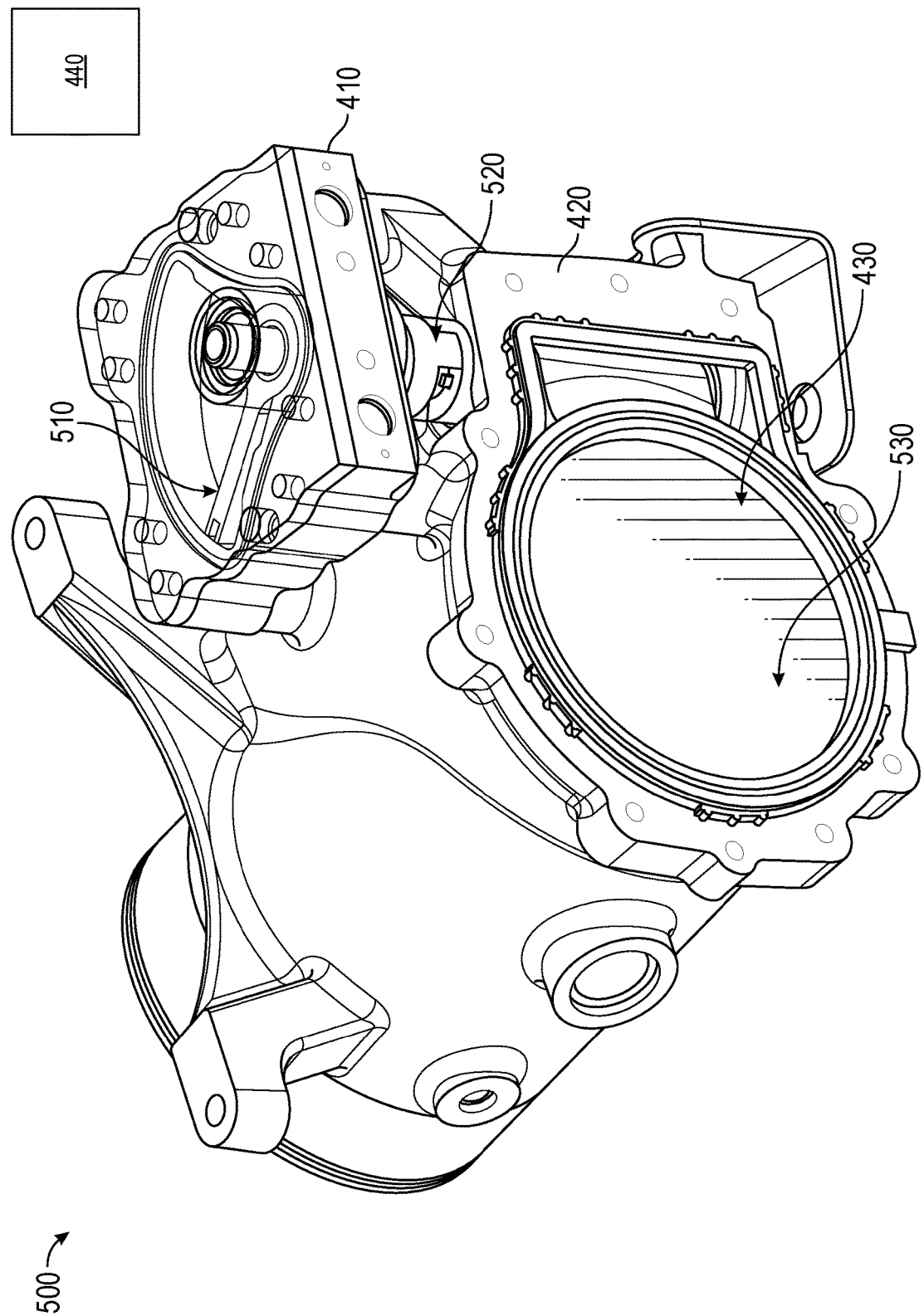
FIG. 5 is a diagram of a first operational state of the system of FIG. 4.
Figure 6:
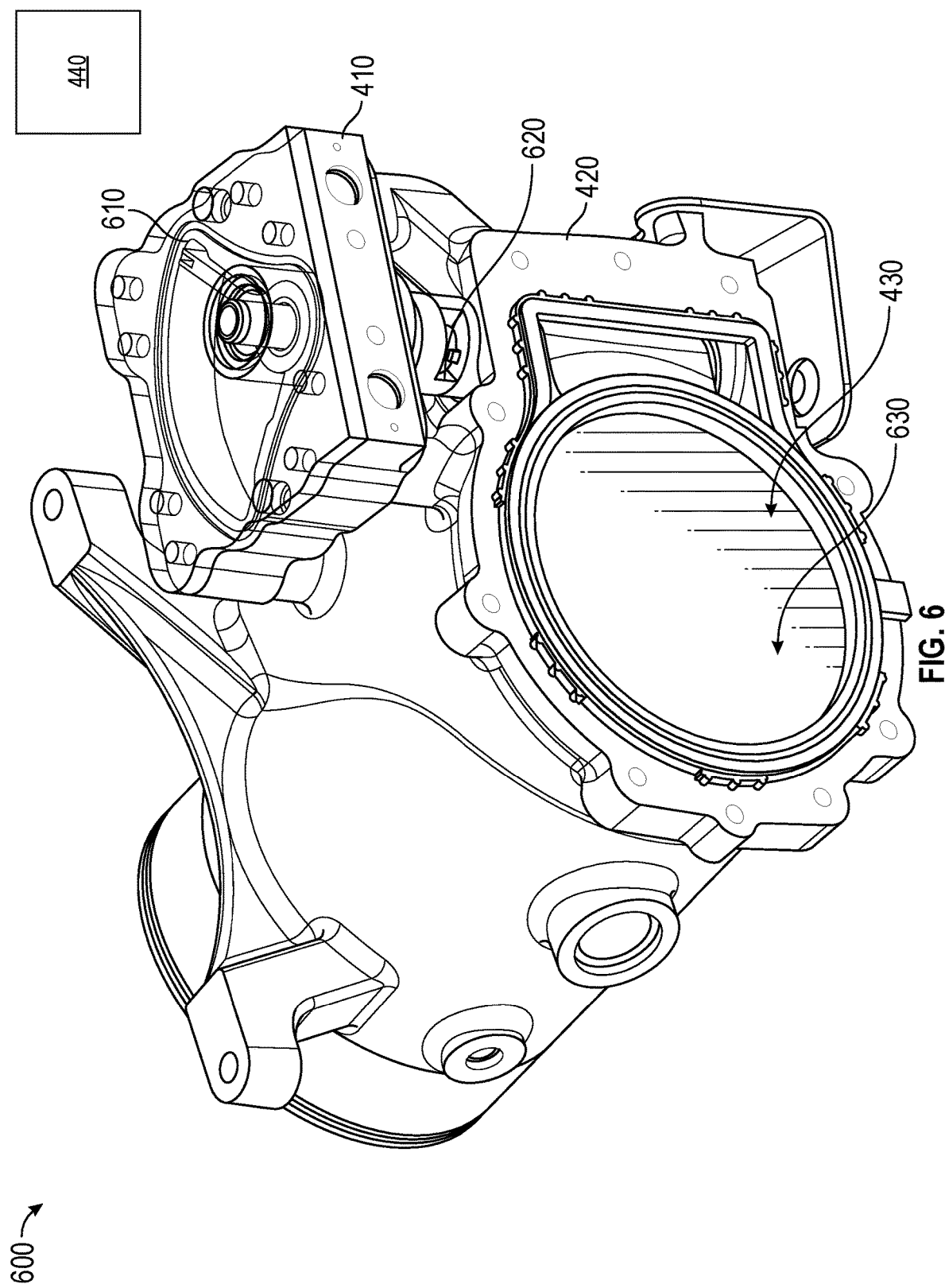
FIG. 6 is a diagram of a second operational state of the system of FIG. 4.

FIG. 5 is a diagram showing an example first operational state 500 of the system of FIG. 4. FIGS. 5-6 show respective operational states of system 400, and may be viewed in sequence to understand a process for opening valve 430. First operational state 500 may be considered an at-rest state, in which fluid intake is not expected to occur and valve 430 is closed.

As shown in FIG. 5, in first operational state 500, actuator 410 may be in a first actuator position 510. When actuator 410 is in first actuator position 510, first ring 210-1 and first member 220-1 may be in first position 520. In first position 520, first member 220-1 may restrict or prevent rotation of second ring 210-2. As shown, when actuator 410 is in first actuator position 510 and first ring 210-1 is in first position 520, valve 430 may be in a closed position 530.

FIG. 6 is a diagram showing a second operational state 600 of the system 400 of FIG. 4. In second operational state 600, actuator 410 has moved from first actuator position 510 to second actuator position 610. For example, actuator 410 may move to second actuator position 610 based on a signal from controller 440 that may cause hydraulic fluid to be pumped into inlet 450. As shown, first ring 210-1 and first member 220-1 may move to a second position 620 based on actuator 410 moving to second actuator position 610. In second position 620, second ring 210-2 is substantially free to rotate so that second member 220-2 moves toward first member 220-1, thereby permitting valve 430 to open, as described in more detail in connection with FIG. 7, below. As further shown, in second operational state 600, valve 430 may be in a closed position 630.

FIG. 7 is a diagram showing a third operational state 700 of the system 400 of FIG. 4. In the third operational state 700, valve 430 is in an open position 710. For example, valve 430 may be in the open position 710 based on fluid pressure of air en route to an air induction system downstream from valve 430. As shown by reference number 720, second ring 210-2 may rotate freely (e.g., substantially unrestricted by first member 220-1) until second member 220-2 engages first member 220-1.

As indicated above, FIGS. 5-7 are provided as examples. Other examples may differ from what was described with regard to FIGS. 5-7.

INDUSTRIAL APPLICABILITY

The disclosed coupling 200 may be used with any system where unimpeded opening of a valve 430 is desired, such as an air induction system used with an engine 180. Referring now to FIGS. 5-7, it can be seen by comparing FIG. 6 and FIG. 7 that second ring 210-2 can move substantially freely until engaged by first member 220-1 when valve 430 moves from closed position 530/530 to open position 710. This may reduce delay in opening valve 430 during operation of system 400. For example, if valve 430 were directly coupled to actuator 410, valve 430 may need to displace hydraulic fluid and/or overcome inertia of actuator 410 in order to move to open position 710, which may take a significant amount of time. When valve 430 is delayed or prevented from opening, performance of downstream components may be impacted due to overspeeding of components, insufficient airflow, and/or the like. As just one example of the improvement contemplated herein, for a rotary hydraulic actuator and an air valve, the usage of coupling 200 may be expected to reduce an amount of time required to open valve 430 from approximately 3-4 seconds to approximately 0.2 seconds. Thus, coupling 200 may provide substantially unrestricted opening of valve 430 when actuator 410 is in the second actuator position 610, and may allow the closing of valve 430 by actuator 410. This may reduce the amount of time required to open valve 430, thus improving longevity and performance of downstream components.

Furthermore, coupling 200 may enable the closing of valve 430 by actuator 410. Referring to FIGS. 5-7, in a case where system 400 starts in third operational state 700 and actuator 410 moves from second actuator position 610 to first actuator position 510, actuator 410 may rotate first ring 210-1 around common axis 250 from second position 620 to first position 520, since actuator 410 is coupled to first ring 210-1 by shaft 230 and/or key 310. First member 220-1 may move second member 220-2 and second ring 210-2 to the position shown in first operational state 500. This may close valve 430, since valve 430 is coupled to second ring 210-2 by shaft 240.

Controller 440 may control operations of system 400. For example, controller 440 may transmit a signal to cause actuator 410 to move from first actuator position 510 to second actuator position 610 or vice versa. Controller 440 may control actuator 410 based on operation of system 400 and/or operation of engine 180 in which system 400 is included. For example, controller 440 may transmit a signal to move actuator 410 to second actuator position 610 a particular length of time before valve 430 is to open to provide air flow for an air induction system of engine 180. Controller 440 may transmit a signal to move actuator 410 to first actuator position 510 when valve 430 is to be closed (e.g., based on ceasing operation of engine 180, based on detecting contaminants or particles in air flowing via valve 430, and/or the like).

As used herein, the articles "a" and "an" are intended to include one or more items, and may be used interchangeably with "one or more." Also, as used herein, the terms "has," "have," "having," or the like are intended to be open-ended terms. Further, the phrase "based on" is intended to mean "based, at least in part, on."

The foregoing disclosure provides illustration and description, but is not intended to be exhaustive or to limit the implementations to the precise form disclosed. Modifications and variations may be made in light of the above disclosure or may be acquired from practice of the implementations. It is intended that the specification be considered as an example only, with a true scope of the disclosure being indicated by the following claims and their equivalents. Even though particular combinations of features are recited in the claims and/or disclosed in the specification, these combinations are not intended to limit the disclosure of various implementations. Although each dependent claim listed below may directly depend on only one claim, the disclosure of various implementations includes each dependent claim in combination with every other claim in the claim set.

What is claimed is:

1. A coupling, comprising:
  a first ring and a second ring that share a common axis,
    wherein the first ring is configured to rotate about the common axis from a first position to a second position;
  a first member extending from the first ring,
    wherein an outside surface of the first member is same distance from the common axis as an outside surface of the first ring; and
  a second member extending from the second ring,
    wherein the second ring rotates freely until the second member engages the first member,
    wherein, when the first ring is in the second position and a valve coupled to the second ring is in an open position, the second member engages the first ring, and
    wherein, when the first ring moves from the second position to the first position, the first member causes the second ring to rotate in a same direction as the first ring.

2. The coupling of claim 1, further comprising:
  a first shaft that couples the first ring to an actuator; and
  a second shaft that couples the second ring to the valve.

3. The coupling of claim 2, wherein the first ring further comprises a first key to engage the first shaft.

4. The coupling of claim 2, wherein the second ring further comprises a second key to engage the second shaft.

5. The coupling of claim 1, wherein the first member is one of a plurality of first members extending from the first ring and the second member is one of a plurality of second members extending from the second ring.

6. The coupling of claim 1, wherein the first member extends from the first ring toward the second ring.

7. A system, comprising:
a valve;
an actuator; and
a coupling comprising a first component coupled to the actuator and a second component coupled to the valve,
wherein the first component and the second component share a common axis,
wherein a first member extends from the first component toward the second component and a second member extends from the second component toward the first component,
wherein an outside surface of the first member is same distance from the common axis as an outside surface of the first component, and
wherein the second component rotates freely until the second member engages the first member.

8. The system of claim 7, wherein, when the actuator is in a first actuator position, the first component is in a first position, and when the actuator is in a second actuator position, the first component is in a second position.

9. The system of claim 8, wherein, when the first component is in the second position, the valve can move to an open position without the second member engaging the first member.

10. The system of claim 8, wherein, when the first component is in the second position, the valve is substantially unrestricted by the first component with regard to moving to an open position.

11. The system of claim 8, wherein, when the actuator moves from the second actuator position to the first actuator position, the first member engages and moves the second member such that the valve is moved to a closed position.

12. The system of claim 7, wherein the valve comprises an air valve of an air induction system.

13. The system of claim 7, wherein the actuator comprises a rotary hydraulic actuator.

14. The system of claim 7, wherein the first member extends from a plane of the first component toward a plane of the second component, and wherein the second member extends from the plane of the second component toward the plane of the first component.

15. The system of claim 7, wherein the first component is coupled to the actuator by a shaft.

16. The system of claim 7, wherein the first component is coupled to the actuator by a shaft.

17. A method, comprising:
transmitting, by a controller, a signal to cause an actuator to move from a first actuator position to a second actuator position,
wherein the actuator is coupled to a first component,
wherein moving the actuator from the first actuator position to the second actuator position moves the first component from a first position to a second position,
wherein, when the first component is in the second position, a valve is substantially unrestricted by the first component with regard to moving to an open position; and
transmitting, by the controller, a signal to cause the actuator to move from the second actuator position to the first actuator position,
wherein moving the actuator from the second actuator position to the first actuator position moves the first component from the second position to the first position,
wherein the first component engages a second component coupled to the valve when the first component is moved from the second position to the first position, thereby closing the valve,
wherein a first member extends from the first component,
wherein a second member extends from the second component,
wherein an outside surface of the first member is same distance from a common axis as an outside surface of the first component, and
wherein the second component rotates freely until the second member engages the first member.

18. The method of claim 17, wherein the valve is moved to the open position based on a pressure differential associated with a vacuum of an air induction system.

19. The method of claim 17, wherein the actuator comprises a rotary hydraulic actuator.

20. The method of claim 17, wherein transmitting the signal to cause the actuator to move from the first actuator position to the second actuator position comprises:
transmitting the signal a particular length of time before the valve is to open.

* * * * *